May 13, 1969　　　W. OBROWSKI ET AL　　　3,444,373
APPARATUS AND METHOD FOR CONSTRUCTING APPARATUS
FOR MEASUREMENT OF NEUTRON FLUX
Filed June 16, 1965
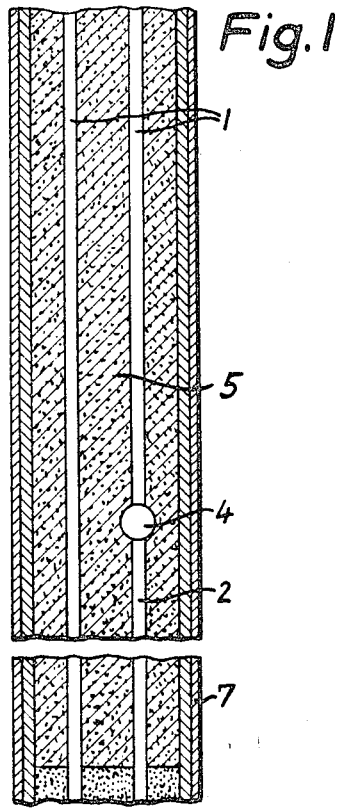
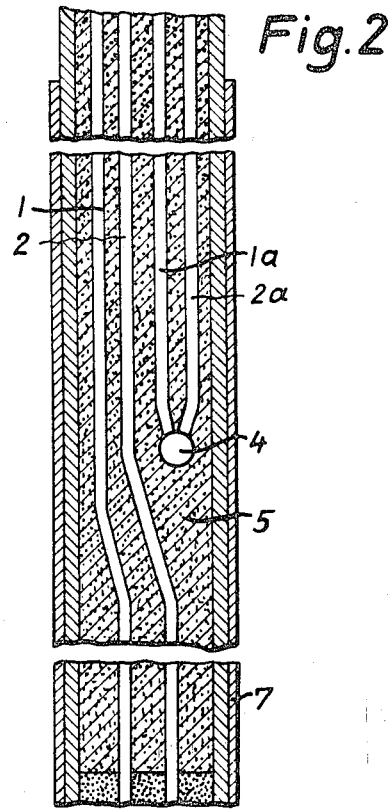
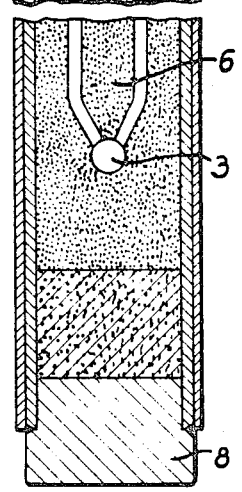
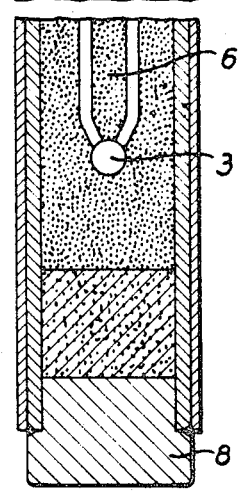
Inventors:
Walter Obrowski
Karl-Heinz Börnig
Elmar Schrüfer
By: Spencer & Kaye
Attorneys United States Patent Office 3,444,373
Patented May 13, 1969

3,444,373
APPARATUS AND METHOD FOR CONSTRUCTING APPARATUS FOR MEASUREMENTS OF NEUTRON FLUX
Walter Obrowski, Hanau, Karl-Heinz Börnig, Offenbach (Main), and Elmar Schrüfer, Langen, Germany, assignors to Licentia Patent-Verwaltungs-G.m.b.H., and Deutsche Gold- und Silber-Scheideanstalt vormals Roessler, Frankfurt am Main, Germany
Filed June 16, 1965, Ser. No. 464,519
Claims priority, application Germany, June 16, 1964, L 48,063
Int. Cl. G01t 3/00; H01j 39/32
U.S. Cl. 250—83.1                  3 Claims

ABSTRACT OF THE DISCLOSURE

A neutron flux measuring device having a sheath made of heat conducting material filled partly with a neutron-sensitive and partly with a neutron-insensitive non-electrically conducting substance. Two thermoelements, one embedded in the neutron-sensitive substance the other in the insensitive substance are connected either in series or parallel and measure the amount of heat produced by the interaction of neutrons with the neutron-sensitive substance. The desired degree of packing density, at least of the neutron-sensitive material, may be obtained by drawing the device through a die to decrease the diameter of the sheath.

---

The present invention relates to measuring apparatus.

More particularly, the present invention relates to a device for measuring a flow of neutrons, with the help of thermoelements, by utilizing the heat produced at the so-called "hot" junction of the thermoelement when a neutron-sensitive substance is bombarded with neutrons.

In order to allow the neutron flow distribution measurements to be made in the core of a reactor, suitable detectors are needed which are sufficiently small and which can withstand the temperature and pressure in the reactor core. Such detectors are presently constituted by ionization chambers containing boron 10 or uranium 235. In the case of experimental reactors, it is also known to use gold foils for measuring the size and the spatial distribution of the thermic neutron flow within and about the reactor core, which gold foils become activated. These methods, however, have the drawback that it is relatively tedious and that the result of the measurement is available, at the earliest, several hours after the activation. Furthermore, the gold foils can be activated in the reactor core only when the reactor power rating is no more than of the order of several kilowatts.

There exist measuring apparatus in which the flow distribution measurements are carried out by the heat liberated during the neutron reaction. The apparatus used for this purpose comprises a thermoelement whose hot junction is surrounded by a neutron-sensitive material. Conventionally, this neutron-sensitive material is boron or uranium. These substances are particularly suitable for measuring heavy neutron flows, i.e., they can be used for carrying out measurements in high-power reactors and have the advantage that they can put out a direct indication. The thermic neutrons trigger nuclear reactions in these substances, with the energy remaining in the absorption material. Under equilibrium conditions, this continuous heating warms up this one junction, so that the amplitude of the thermovoltage is a measure of the prevailing neutron flow. One difficulty, however, is that this conventional apparatus for measuring a neutron flow by means of thermoelements is so large that it can not be used for measuring the neutron flow in special elements or between fuel cells, or in other not readily accessible places.

In order to obtain an exact measurement of the neutron flow, the external disturbances have to be eliminated to as large an extent as possible. What is of particular significance is the temperature, and especially the temperature difference between the hot and cold junctions which prevails exteriorly of the apparatus. Other disturbances result from the heating up produced by gamma rays. One attempt which has been made to overcome this drawback is to provide such an apparatus, i.e., an apparatus for measuring the neutron flow by means of thermoelements whose hot junction is surrounded by a neutron-sensitive substance and whose cold junction is surrounded by substance which is insensitive to neutrons and which has the same, or approximately the same, atomic number, with a jacket which is made of good insulating material and which surrounds the thermojunctions. (See British Patent 950,896.) As a result, the sheath will have the same temperature in the region of the two junctions. In one such apparatus the neutron-sensitive and neutron-insensitive substances are metals or alloys which are joined to the junctions. The difficulty here is that the mechanical problems incident to the manufacture of such apparatus are great. Furthermore, it is very expensive to produce such apparatus with a sufficiently smaller diameter, e.g., a diameter of the order of 3 mm.

It is, therefore, the primary object of the present invention to provide an apparatus of the above type which overcomes the above drawbacks, and, with this object in view, the present invention resides in such an apparatus in which the neutron-sensitive and neutron-insensitive substances themselves act as electrical insulating means. More particularly, the present invention resides in a neutron-sensitive measuring device which comprises a sheath made of a material which is a good conductor of heat, there being means arranged in the sheath which form two thermojunctions. A first mass, which is also arranged in the sheath, surrounds one of the two junctions, this first mass being made of a material which is both neutron-sensitive and electrical insulating, and a second mass, which is also arranged in the sheath surrounds the other of the two junctions, this second mass being made of a material which is both neutron-insensitive and electrical insulating. The material of which the second mass is made has an atomic number which is at least approximately the same as the atomic number of the material of which the first mass is made.

Additional objects and advantages of the present invention will become apparent upon consideration of the following description when taken in conjunction with the accompanying drawings in which:

FIGURE 1 is a sectional view of one embodiment of a device according to the present invention.

FIGURE 2 is a sectional view of another embodiment of a device according to the present invention.

Referring now to the drawing and first to FIGURE 1 thereof, the same shows a differential thermoelement which comprises two wires 1 made of the same material, these wires 1 being soldered, in the region of the tip of the element, to a wire 2 made of a different material, so as to form two thermojunctions 3 and 4. There will thus appear at the output of the thermoelement a voltage which is a function of the temperature difference between the junctions 3 and 4.

The junction 3 is surrounded by a mass 6 made of neutron-sensitive material, for example boron 10 or uranium 235, preferably in powder form, so that when the thermoelement is placed in a reactor core, the junction 3 will, as a result of the nuclear reaction, become hotter than the junction 4. The thus-obtained temperature difference between the junctions 3 and 4 will, so long as heat is carried off at a constant rate, be a direct measure of the neutron flow. If the thermoelement according to the present invention, together with its neutron-sensitive mass 6, is given a small diameter, for example, by drawing the sheath through a die (not shown) for decreasing the diameter of the sheath 7 containing the powdered mass 6, the nuetron-sensitive material will be compacted, i.e., packed very tightly, and will also come in intimate contact with the junction 3. In this way, the heat transfer conditions will be well defined.

According to the present invention, the sensitivity of the neutron-sensitive thermoelement can be varied by changing the percentage of the neutron-sensitive material in the mass 6, for example boron 10 or uranium 235.

The second junction 4 compensates for the ambient temperature and for heating due to gamma radiation. According to the present invention, the heating caused by the gamma radiation can be accurately eliminated if the reference junction 4 is surrounded by a mass 5 made of a material which has the same, or at least nearly the same, atomic number as the material of which the mass 6 surrounding the junction 3 is made. The material constituting the mass 5 is, however, a material which is insensitive to neutrons, for example mass 5 is made of aluminium or uranium 238 respectively, while mass 6 is made of boron or uranium 235 respectively. It will be understood, however, that the ambient temperature and gamma radiation compensation afforded by the junction 4 will be accurate only if the sheath of the thermoelement has the same temperature in the region of both junctions. Accordingly, the tubular sheath 7 which surrounds the junctions 3 and 4 as well as the masses 6, 5, in which the junctions are embedded, is made of a material which is a good conductor of heat, as, for example, silver or silver-coated metal, as a result of which the temperature uniformity of the sheath is improved.

The lower end of the thermoelement is welded to a plug 8, which seals the lower end in an air-tight manner. Experiments have shown that, due to the tight packing of the insulating material, gaseous substances can not diffuse through the open end of the thermoelement. In this way, the neutron-sensitive substance 6 is encapsulated in a completely hermetic manner between the plug 8 and the mass 5, so that no products of decomposition—insofar as the junction 3 is surrounded by material capable of being decomposed—can penetrate to the outside. The apparatus thus serves as a neutron flow measuring apparatus, in the form of a sheathed differential thermoelement.

The neutron-sensitive mass 6 which surrounds and embeds the thermojunction 3 is uranium dioxide or uranium oxide in powder form, in which case the percentage of uranium 235 can be varied, for example between 0.7 and 20%, to impart the desired sensitivity to the device. The mass 6 may also be powdered boron oxide, and the boron 10 contents thereof may likewise be varied within the same scope to impart the desired sensitivity to the device. The wires 1 and 2 are made for example of platinrhodium and platin or of nickelchrom and nickel respectively.

FIGURE 2 shows a sheathed two-pair thermoelement. The thermoelements 1, 2; 1a, 2a, have junctions 3 and 4. As in the preamble of FIGURE 1, the "hot" junction 3 is surrounded by the mass 6 made of neutron-sensitive material, while the junction 4 is surrounded by the mass 5 of neutron-insensitive material. The thermoelements 1, 2; 1a, 2a, are connected so as to oppose each other, so that the difference of the thermovoltages is a measure of the neutron flow. Furthermore, the embodiment of FIGURE 2 allows the temperature at the junctions 3 and 4 to be measured individually. The thermoelement of FIGURE 2 is likewise provided with a sheath 7 made of a material that is a good conductor of heat, the lower end of this sheath being hermetically sealed by means of the plug 8. In practice, the junctions 3 and 4 will be spaced about 100 mm. from each other, while the diameter of the device is about 3 mm. Other dimensions may be read from the figures which are drawn on the same scale.

The neutron flow meter according to the present invention can also be used for measuring the neutron flow density, for example in a boiler reactor. The temperature of the coolant in the core is about 270° C. The neutron flow is between 2 and $7 \times 10^{13}$ n./cm.$^2$/sec. In order to allow the neutron flow of a reactor core of average power rating to be measured, approximately 64 thermoelements are required, the same being arranged in sets of 4 sheathed thermoelements arranged one above the other.

In addition to being used for so-called in-core measurements, i.e., for taking measurement within the reactor core, the neutron thermoelements can also be used for so-called burst measuring, a "burst" being a sudden and lightening-like appearing nuetron flow peak. Such burst may appear in uranium or plutonium producing plants, and may last from microseconds to seconds. Here, the measuring problem is to measure quantitatively the radiation put out during this flash, and to indicate it quickly and directly. The heretofore conventional ionization chambers and direct current amplifiers used for this purpose have but limited suitability for this inasmuch as their time constants are too large. Such measurements can, however, be taken with the neutron-sensitive thermoelements according to the present invention, in that there is produced in the neutron-sensitive portion of the element an amount of energy which depends on the total number of neutrons which impinge on this neutron-sensitive part, which energy heats up the "hot" junction. The decay time of the thermoelement is long as compared to the time in which the energy is liberated, so that the thermovoltage is a measure of the total, integrated neutron flow which occurs during such a burst.

It will be understood that the above description of the present invention is susceptible to various modifications, changes, and adaptations, and the same are intended to be comprehended within the meaning and range of equivalents of the appended claims.

What is claimed is:

1. A neutron-sensitive measuring device, comprising, in combination:
   (a) a sheath made of a material which is a good conductor of heat;
   (b) means arranged in said sheath and forming two thermojunctions;
   (c) a first mass totally filling part of said sheath and surrounding one of said two junctions, said first mass being made of a material which is both neutron-sensitive and electrical insulating; and
   (d) a second mass totally filling another part of said sheet and surrounding the other of said two junctions, said second mass being made of a material which is both neutron-insensitive and electrical insulating, the material of which said second mass is made having an atomic number which is at least approximately the same as the atomic number of the material of which said first mass is made.

2. A device as defined in claim 1 wherein said first mass and said second mass are heat insulating.

3. In a method of making a device as defined in claim 1, the step of drawing the device through a die for decreasing the diameter of the sheath while the same contains at least the neutron-sensitive mass for compacting said neutron-sensitive mass.

References Cited
UNITED STATES PATENTS

| | | | |
|---|---|---|---|
| 2,437,476 | 3/1948 | Parker | 250—83.1 |
| 2,993,138 | 7/1961 | Scott | 313—61 |
| 3,028,494 | 4/1962 | Wickersham | 250—83.1 |
| 3,226,547 | 12/1965 | Bloom | 250—83.1 |

FOREIGN PATENTS 950,896  2/1964  Great Britain.

RALPH G. NILSON, *Primary Examiner.*

A. B. CROFT, *Assistant Examiner.*